United States Patent [19]

Repas

[11] Patent Number: 5,177,470
[45] Date of Patent: Jan. 5, 1993

[54] SENSOR DEVICE FOR PARTICLES IN AN AIR STREAM

[75] Inventor: Lorne Repas, Winnipeg, Canada

[73] Assignee: Vansco Electronic Ltd., Winnipeg, Canada

[21] Appl. No.: 563,068

[22] Filed: Aug. 6, 1990

[51] Int. Cl.⁵ ............................................. G06F 15/20
[52] U.S. Cl. .................................. 340/684; 340/627; 73/1 R; 221/21
[58] Field of Search ............... 340/684, 627, 608, 609; 73/1 R, 4 R, 28.03, 28.05, 863.22, 861.18, 861.23, 579; 221/21

[56] References Cited

U.S. PATENT DOCUMENTS 4,268,825  5/1981  Kaplan .............................. 340/684
4,333,096  6/1982  Jenkins et al. ..................... 340/684

FOREIGN PATENT DOCUMENTS 3419883  11/1985  Fed. Rep. of Germany ...... 340/684

Primary Examiner—Edward L. Coles, Sr.
Assistant Examiner—Jill Jackson
Attorney, Agent, or Firm—Adrian D. Battison; Stanley G. Ade; Murray E. Thrift

[57] ABSTRACT

The blockage module is designed to be mounted on air seeder seeding equipment. Piezoelectric sensors extending into the flow tubes monitor flow by producing high frequency ringing signals when struck by seeds. During a calibration step, the module will monitor each sensor and adjust the gain of the signal until the number of seed hits per second above a fixed voltage threshold is near a predetermined value. Each sensor connected to the module will be similarly calibrated, and the calibrated gain and hit rate will be stored. It has been found that if a blockage or partial blockage occurs under these calibrated conditions, the number of hits above the fixed voltage threshold will be sharply reduced. The reduced hit rate is compared to the calibrated hit rate, and an alarm is generated if the reduction is great enough. Because the reduced hit rate is immediately detectable, the response time to report a blockage is very short.

16 Claims, 5 Drawing Sheets

SENSOR DEVICE FOR PARTICLES IN AN AIR STREAM

BACKGROUND OF THE INVENTION

This invention relates to a sensor system for monitoring the movement of particulate elements in a duct system including a plurality of ducts.

One example of an arrangement in which the device of the present invention may be used is that of an air seeder. An air seeder system consists of a large pressurized material tank for seed or fertilizer, a fan, supply tubes going to the seeding equipment and the seeding equipment itself. During operation the fan forces air through the supply tubes which typically run underneath the material tank. Product is metered into the air stream in the tubes carrying the material in particulate form to the seeding equipment. At the seeding equipment, the air stream is divided into smaller tubes each of which is positioned above the location on the machine where a seeded row is to be made. The seeds are then blown into the seed bed as it is prepared by the seeding equipment. Generally this seed bed is prepared by a knife which is drawn through the soil with the seed tube positioned behind the knife so that it deposits the seeds as the knife moves forwardly.

During operation a number of faults can occur which will prevent one or more of the seed tubes from properly supplying the seed to the ground. In some cases the seed tube can become disconnected in which case no seeds will be transmitted through the tube at all. In other cases the seeds may collect within the tube and cause a partial blockage. In other cases soil will enter the lower end of the seed tube and will cause a plugging action so that the seeds are blocked at the point where they enter the ground and while seeds can continue to flow along the tube they collect at the blockage point and are not properly seeded.

While these blockages have been known and occur on a regular basis, it has been difficult to provide equipment which satisfactorily detects the movement of the particulate elements. Many air seeders therefore do not have any detection equipment and hence the operator is not aware of any blockages and many rows can therefore be left unseeded reducing resultant yields.

Various equipment has been provided in an attempt to provide a monitor system which properly detects movement of seeds or other particulate elements through the tubes. Fault conditions where flow of the particles is cut off completely (such as a disconnected hose) are relatively easy to detect. However when a blockage occurs downstream of the sensor in the seed tube, it is possible that seeds will still be carried down the tube. In most cases the sensor provided detects these slow moving seeds and assumes that the tube is operating normally with the seeds flowing to the downstream end for discharge. However one major fault which occurs in air seeding equipment is a blockage at the end of the tube and this blockage would therefore not be detected by a device of this type until the tube is filled up to the sensor. This occurs of course only after a lengthy period of time so that the seeds collected in the tube are generally wasted and rows are left unseeded.

Conventionally the sensors used employ a piezoelectric crystal together with an element which projects outwardly into the duct so that the element is struck by seeds or other particles passing along the duct thus producing in the crystal high frequency ringing signals.

These signals are then transmitted to a suitable detection module which analyzes the signals and attempts to indicate when one or more of the tubes is not operating properly.

Examples of systems of this type are shown in U.S. Pat. No. 4,079,362 (Grimm) and U.S. Pat. No. 4,463,345 (Okkerse). The Grimm patent is concerned with the mounting of the piezoelectric crystal and mentions only briefly the system for analysis for the signals produced. The Okkerse patent relates to a system in which the transmission of the signals to the central monitor is carried out by a sequencing unit so as to reduce the period of time necessary for transmission of a fault signal to the central monitor. Neither of these patents addresses the problem of the analysis of the signals to produce a fault signal while particles continue to flow within the duct but at reduced velocity due to a downstream blockage.

U.S. Pat. No. 3,927,400 (Knepler) discloses a further system for counting the number of seeds delivered and comparing that number with a required number. The device uses a photoelectric sensor device which senses the presence or absence of a seed and hence would not be able to detect slow moving seeds caused by a blockage downstream of the detection system.

SUMMARY OF THE INVENTION

It is one object of the present invention, therefore, to provide an improved monitoring system for particulate elements moving in an airstream in which the system is sufficiently sensitive to detect blockages downstream of the sensor.

According to a first aspect of the invention, there is provided a monitor system for the flow of discrete particulate elements in a duct system comprising a plurality of sensors, each sensor including sensor means for generating a sensor signal when the sensor is impinged upon by one of the elements, and means for mounting the sensor means on a respective one of a plurality of ducts of the duct system, a detection module and means for connecting each of the sensors to the detection module, the detection module including electronic circuit means defining comparator means for receiving the sensor signals from one of the sensors and arranged to select during a predetermined period of time a number of the sensor signals which have an amplitude greater than a certain value, means for counting the number of sensor signals selected, means defining a calibration mode of the detection module, means for generating in the calibration mode a plurality of separate reference values each associated with a respective one of the sensors and dependent upon the number of selected sensor signals counted from the respective sensor in said period of time, means for storing said separate reference values, means defining a detection mode of the detection module, and means responsive to said reference value for each respective sensor for generating a fault signal associated with said respective sensor dependent upon the number of selected sensor signals from the respective sensor counted during a predetermined detection period.

According to a second aspect of the invention, there is provided a monitor system for the flow of discrete particulate elements in a duct system comprising a plurality of sensors, each sensor including sensor means for generating a sensor signal when the sensor is impinged upon by one of the elements, and means for mounting the sensor means on a respective one of a plurality of ducts of the duct system, a detection module and means for connecting each of the sensors to the detection module, the detection module including electronic circuit means defining means for receiving the sensor signals from each of said sensors, variable amplifier/attenuator means for variably modifying the amplitude of the sensor signals received in dependence upon a gain input value, comparator means arranged to select during a predetermined period of time a number of the sensor signals for which the modified amplitude is greater than a predetermined fixed value, means for counting the number of sensor signals selected, means for defining a calibration mode of the detection module, means for generating in the calibration mode for each sensor a reference value, said reference value comprising that gain input value for the amplifier/attentuator which most closely will generate the number of sensor signals selected to a preferred number, means for storing said reference values, means for defining a detection mode of the detection module, means in said detection mode for counting the number of sensor signals selected for each sensor using for that sensor the reference value as the gain input value for the amplifier/attentuator and means for generating a fault signal if the number counted falls below a predetermined number.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention in which:

DESCRIPTION OF THE DRAWINGS

In the drawings like characters of reference indicate corresponding parts in the different figures.

DETAILED DESCRIPTION

Figure 1:
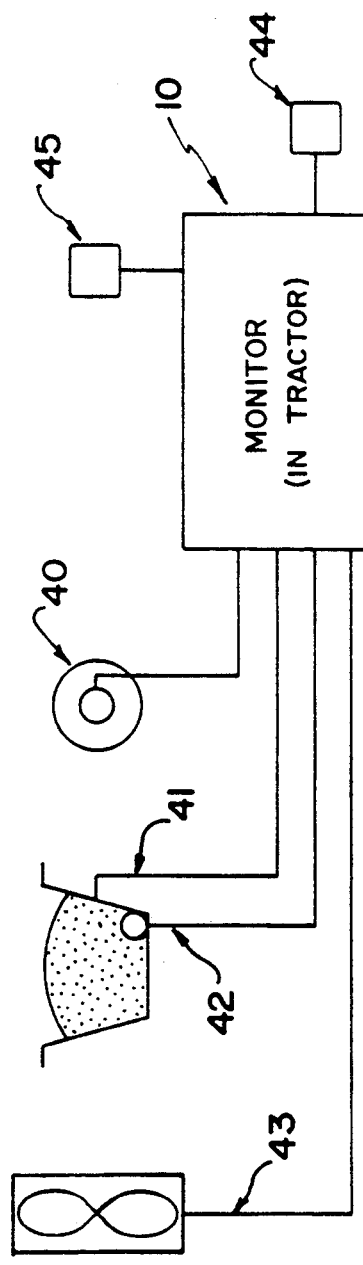
FIG. 1 is a schematic view of the monitor system according to the invention.

The system shown in FIG. 1 comprises a main monitor 10 for mounting at a central location for example in the tractor associated with an air seeder. The main monitor is connected to a plurality of blockage or detection modules 11 described in detail hereinafter. The connection from the monitor to the modules is provided by a single bus which contains power and data connections. Each module is attached to a plurality of sensors for receiving signals from the sensors.

Figure 4:
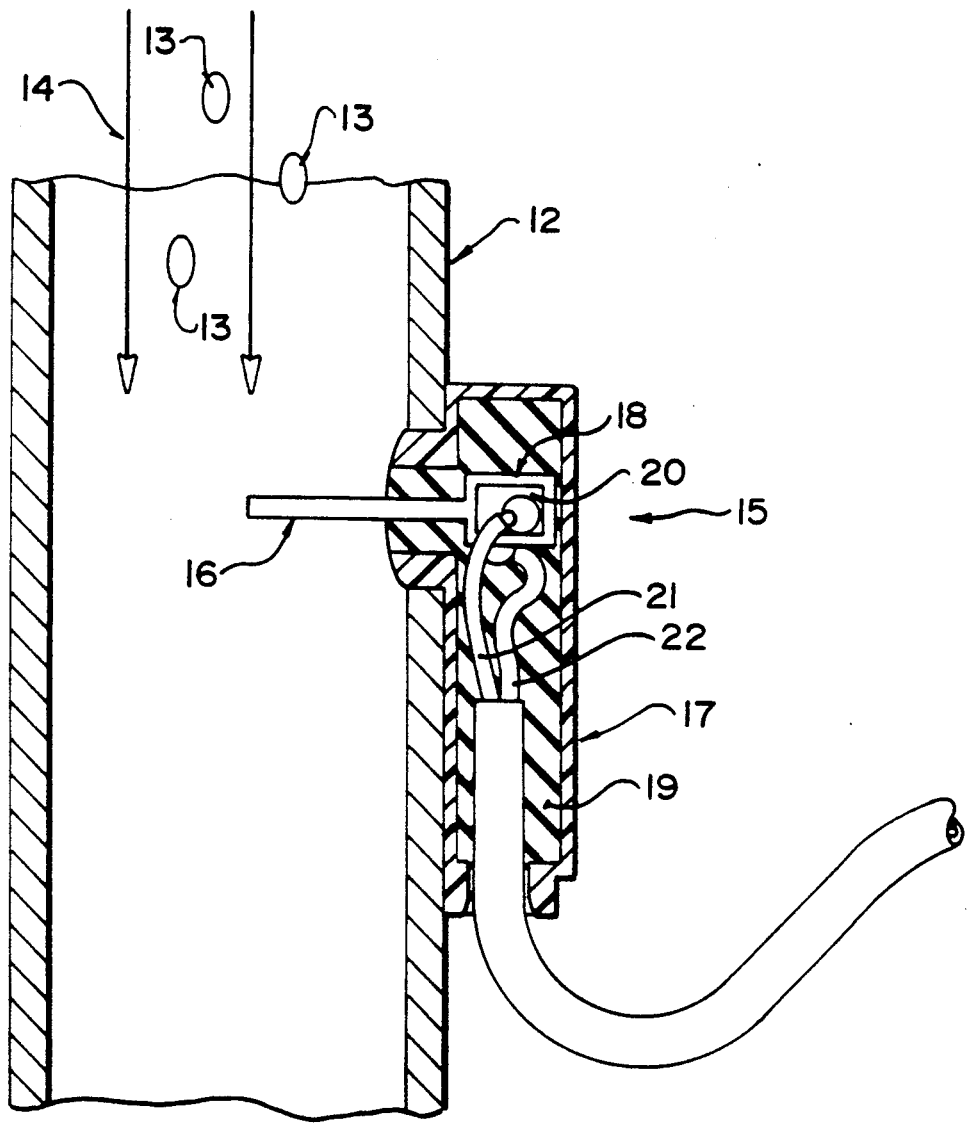
FIG. 4 is a cross sectional view of a sensor.

One of the sensors is shown in FIG. 4 mounted in a duct 12 through which the particles 13 move in an airstream 14.

The duct 12 comprises one duct of a plurality of ducts of a duct system for example an air seeder with each duct having associated therewith a particular one of the sensors. The sensor is generally indicated at 15 and comprises a pin 16 and a support body 17. A support body is a plastic moulded casing which surrounds an outer end of the pin and supports the pin so that it can project outwardly into the center area of the duct. The pin has a head 18 at the outer end supported within the body 17. The head is embedded within a resilient potting material 19 so that the pin is supported to project outwardly into the duct but is free to vibrate when impacted by one of the particulate elements 13. The potting material acts to dampen vibrations caused by movement of the duct.

The head carries on one side a piezoelectric crystal 20 one side of which is attached to the head of the pin and the other side of which is soldered to an electrical connection of a detection wire 21. The other wire 22 is soldered to the other side of the head 18 so that vibration of the pin generates a voltage across the wires 21 and 22. The wires are directly connected to a pair of terminals of the blockage module 1 associated with that particular sensor.

Each blockage module can accommodate up to 12 sensors and thus provides separate terminals for the wires of each of those sensors.

Figure 2:
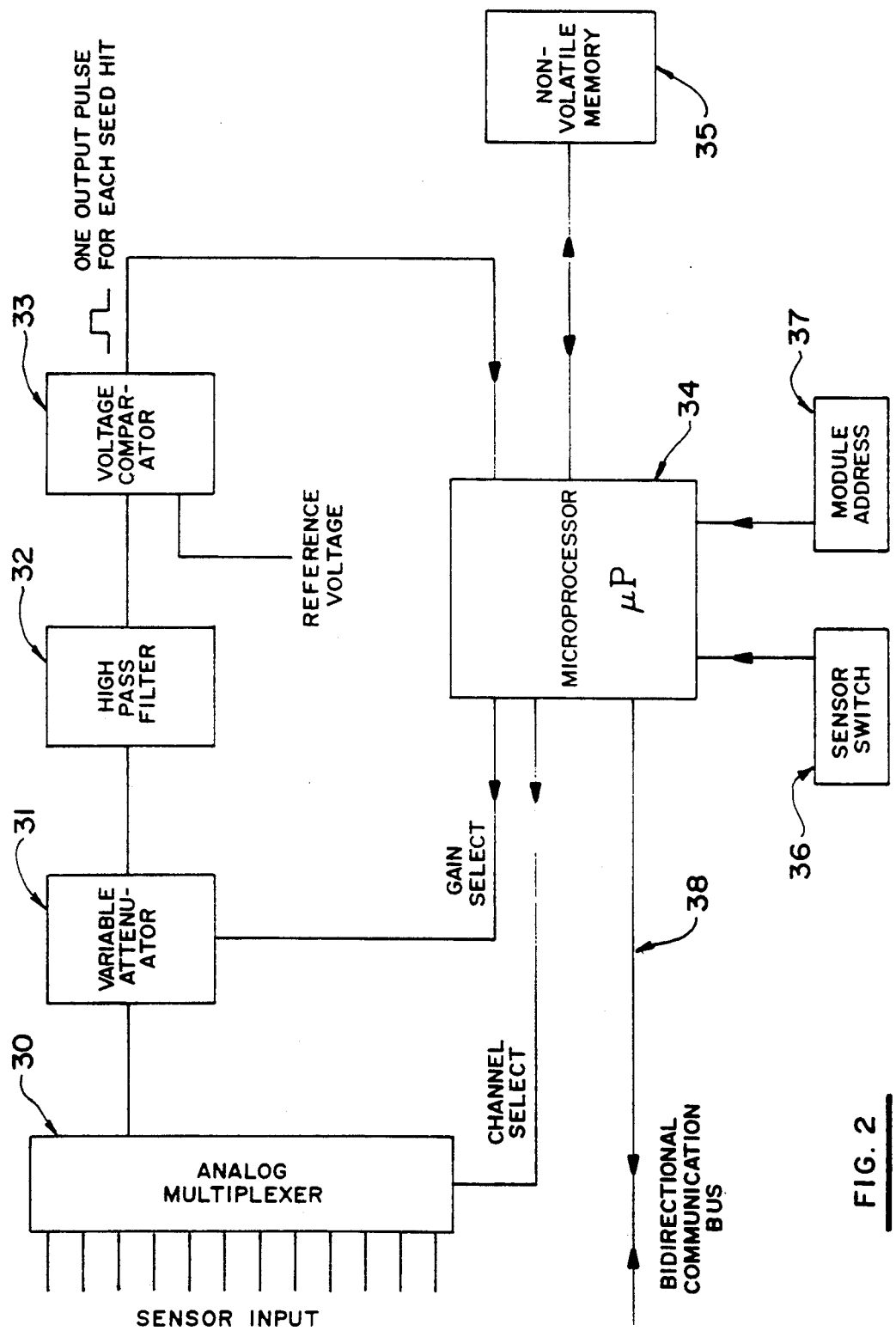
FIG. 2 is a schematic circuit diagram of the circuit of one detection or blockage module.
Figure 3:
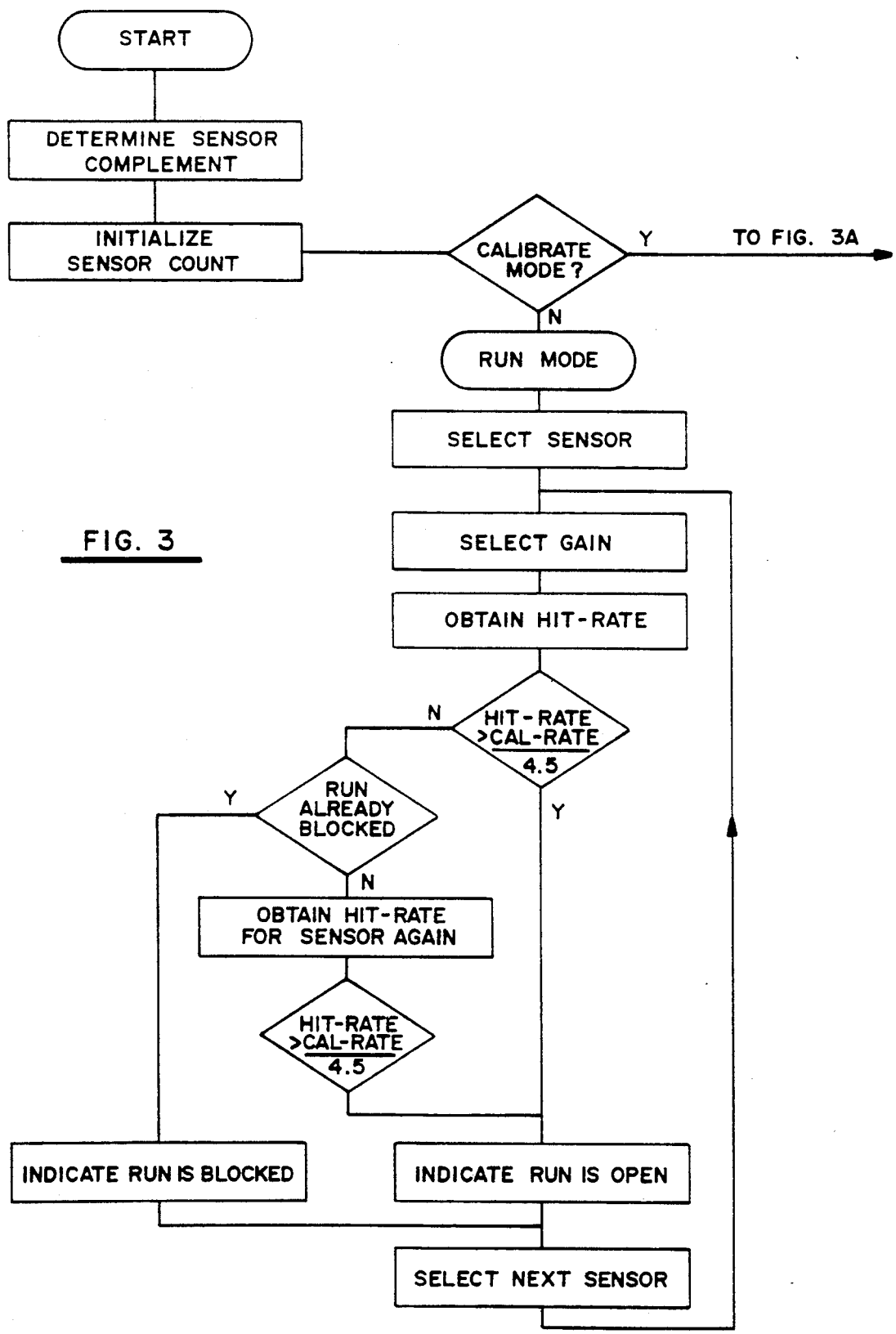
FIG. 3 is a partial flow chart for the detection module.
Figure 3A:
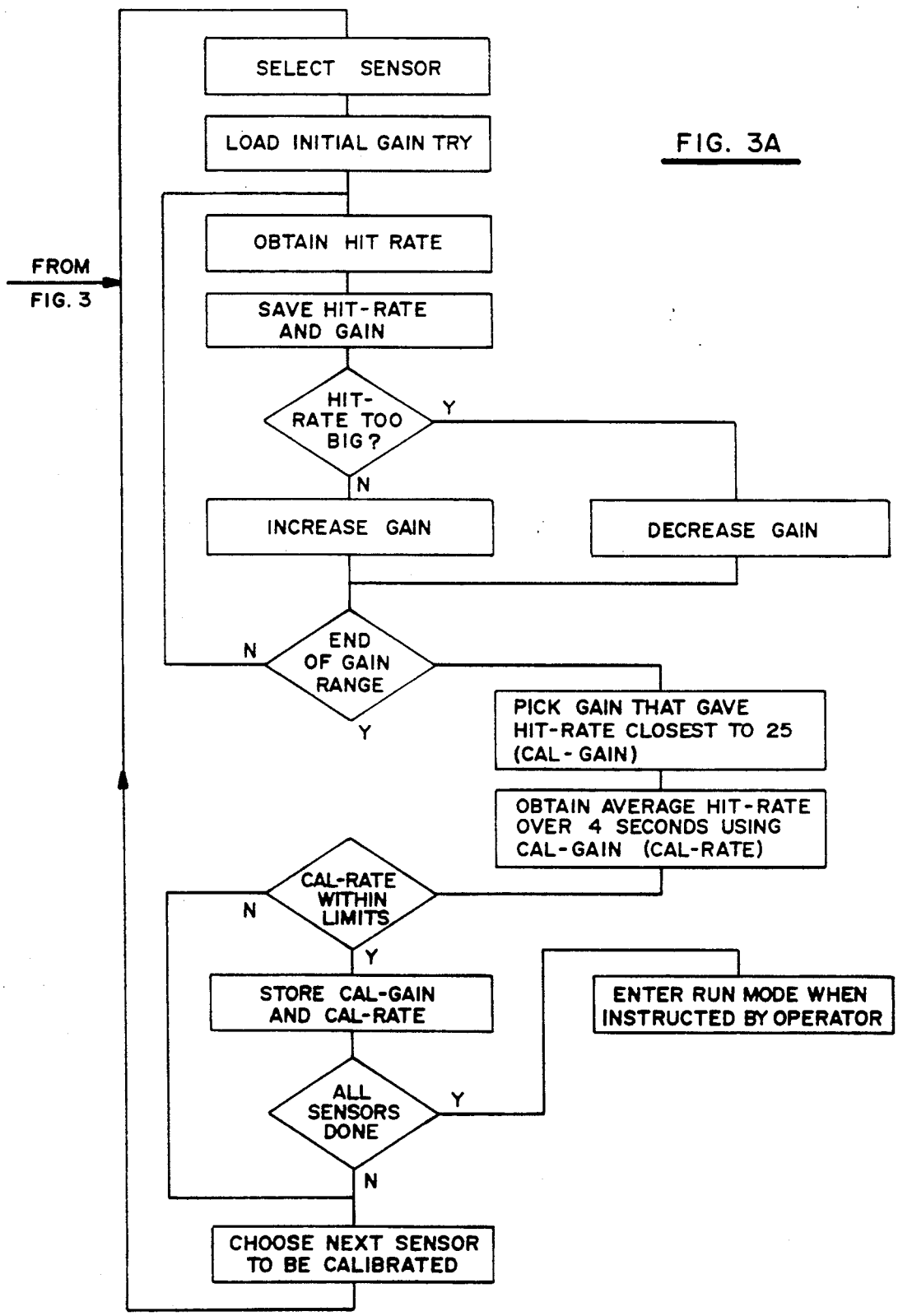

The blockage module is shown in more detail in FIG. 2 and the operation of the blockage module is illustrated in the flow chart of FIG. 3. The blockage module comprises an analogue multiplexer 30, an amplifier/attenuator 31, a high pass filter 32 and a comparator 33. A microprocessor 34 controls the operation of the signal analyzing system above and includes a memory 35. A switch 36 can be manually operated to set the number of sensors attached to the particular microprocesser. A module address 37 provides an input to the microprocesser indicating the particular module concerned. A connection line 38 provides communication by suitable terminals to the bidirectional communication bus.

As shown in FIG. 1, the monitor unit mounted in the tractor includes a sensor schematically indicated at 40 for detecting ground speed, a sensor 41 for detecting the full/empty status of the material tank, a sensor for detecting the speed of rotation of a metering shaft of the material tank as indicated at 42 and a sensor 43 for metering the speed of a fan driving the air flow of the air seeder. Additional sensors for further tanks and further metering shafts are included but now shown in the schematic illustration.

The monitor further includes a manually operable switch schematically indicated at 44 for indicating the number of blockage modules attached together with a manually operable switch 45 which controls the functions of the monitor.

Initially the switch 45 can be actuated to set the monitor into a calibration mode. This calibration mode is communicated as a signal along the common communications bus to each of the blockage modules.

Turning therefore to the partial flow chart of FIG. 3, the main aspects of the operation of the blockage module are set out in flow chart form.

On receipt of the signal for the calibration mode, therefore, the microprocessor 34 acts initially to select a particular one of the sensors attached to the analogue multiplexer 30. Generally when a particular sensor is selected, the sensor signals are applied through the multiplexer to the variable attenuator. The attenuator 31 comprises a digital to analogue converter so that a digital number input into the attenuator 31 from the microprocessor acts to provide a particular attenuation ratio to the signals from the sensor. A variation of the digital number input into the terminal 31 will vary the ratio of attenuation. The filter 32 acts to filter out any low frequency signals which are generated by the piezoelectric crystal so as to eliminate those signals which are not related to the impingement of a particulate element on the sensor pin. The comparator 33 acts to compare the signal amplitude of the attenuated sensor signal with a reference voltage and to provide an output count pulse for each signal which the amplitude exceeds the fixed reference voltage.

It will be appreciated therefore that the variation of the amplitude provided by the attenuator 31 enables the system to vary the amplitude of the sensor signals which are selected. In the embodiment shown this is carried out by the attenuation system so that the signal is firstly varied in amplitude and then compared to the fixed reference voltage. It will of course be appreciated that the same process could be carried out by a variable amplification of the signal and comparison with a further reference voltage. In another arrangement it is possible to vary the reference voltage while leaving the sensor signal amplitude unchanged. In this way the system selects only those sensor signals which have an amplitude greater than a certain value and that certain value can be varied as explained hereinafter.

Reverting therefore the flow chart, the microprocessor initially loads into the attenuator 31 an initial gain value by way of a digital number. For a set period of time, preferably one second, the system then acts to count those sensor signals which have an attenuated amplitude greater than the reference voltage.

Generally the intention of the system is to select a gain for the attenuator 31 which provides a number of pulses during the period of time equal to a predetermined preferred number. Experimentation has shown that the preferred number of the practical system concerned is 25 since this preferred number gives for the system the maximum rate of change for variations in sensor pulse amplitude. This number can vary in accordance with practical designs but preferably lies in the range 10 to 40.

The number of selected sensor signals counted during the time period is in the flow chart known as the "hit rate". After the first trial the hit rate is obtained and both the gain used and the hit rate obtained are stored by the microprocessor in the memory. The microprocessor then determines whether the hit rate is greater than or smaller than the preferred number in this case 25 and then selects a modified gain for the attenuator 31 depending upon whether the number counted was too large or too small. The microprocessor is programmed to vary the gain through large steps where the difference on the preferred number is large and through smaller steps as the difference decreases. The microprocessor is programmed to repeat the gain selection and counting process through a certain number of trials and in a practical example this may be seven (7) trials and then to select the gain that provided the hit rate closest to the predetermined number that is 25. This selection of the gain can be one of the actual gains tried or can be obtained by extrapolation. The selected gain is then recorded for that particular sensor and retained in memory for subsequent use as described hereinafter. Subsequent to selection of the gain, the calibration process is continued by obtaining an average hit rate over a predetermined number of time periods using the gain selected. In practice the average hit rate will differ from the preferred number in most cases due to statistical variability. If the difference of the hit rate from the preferred number is greater than a particular value, in the practical example the difference being greater than 15, the gain and hit rate are rejected and the process repeated. If the hit rate falls within the allowable limit, the gain is stored as a first reference value and the hit rate is stored as a second reference value for use in the subsequent detection runs as explained hereinafter.

The unit then continues to repeat the process for each of the sensors attached. The switch 36 has previously been operated to enter the number of sensors attached so that the unit does not look for sensor signals from terminals which are not connected to a sensor. When the calibration of all the sensors is complete, the module will provide to the central monitor a signal indicating the calibration as complete. If any of the sensors fail to calibrate, this is also transmitted to the central monitor on receipt of the polling signal from the central monitor. In the event that a sensor detects no signals due to a blockage or failure of the sensor this is indicated as a failure to calibrate.

In the event that all sensors of a particular module detect no signals, this is communicated to the central monitor but the central unit will continue to run ignoring signals from that module on the basis that it is intended for those sensors to be inactive for example due to running the system on only a reduced number of sensors. This might occur when a seeder is being used for supply of seeds only without any fertilizer being supplied through fertilizer tubes which would otherwise be sensed.

The central monitor is programmed so that after the manual switch 45 is operated to commence calibration, the signal initiating calibration submitted to the modules is only transmitted after detection of a ground speed through the sensor 40 greater than a predetermined minimum.

After the monitor has indicated that the calibration is complete, the manual switch 45 can be actuated to commence the run or detection mode during which the actual detection takes place. In the run mode, the module acts again to select a particular one of the sensors by operation of the multiplex 30. The calibrated gain for that particular sensor is then retrieved from memory and input to the attenuator 31. Using that gain the hit rate is obtained by counting the selected pulses. This process is carried out through the predetermined period as previously stated which is preferably one second. The hit rate is then compared with a value obtained by dividing the calibrated hit rate obtained during the calibration process by a fixed value. In one preferred practical example, the fixed value has been found to be 4.5 and this statistically provides an accurate distinction between normal statistical variations and a clear indication that the tube is blocked. If the hit rate is less than the required calculated rate, the processor checks whether this run has previously been indicated as being blocked. If it is then it moves on to the next sensor. If this is the first time that a blockage condition has been detected, the process is repeated to determine whether the condition is also repeated.

In the event that the repeated process further indicates that a blockage is present, the presence of the blockage is communicated to the microprocessor which transmits this information to the central monitor when next polled by the central monitor. The central monitor then provides an alarm signal visually and if required audibly so that the operator can be fully aware of the blockage. The operator can then stop the equipment to clear the blockage or can continue until a more convenient time for clearing the blockage in which case the central monitor alarm can be temporarily cleared.

The run mode process is continued for each sensor repeatedly so that each sensor is checked for example every 12 seconds.

The above analysis of the signals issued from each of the sensors using the first and second reference value is generated by the calibration has been found to indicate not only when there are no particles passing the sensor but also where the particles pass the sensor at reduced velocity due to a downstream blockage. As soon as the blockage therefore occurs and the airstream reduces in velocity, the sensor can indicate this condition and allow the operator to clear the condition if required immediately.

Systems currently available generally operate by setting a global threshold and/or minimum hit rate for all sensors in all tubes. This generally enables only detection of a total absence of seed flow or an inaccurate detection system or is generally inadequate because of the variation in sensor characteristics as well as differing flow characteristics in different tubes on the seeding equipment. The careful analysis by the present inventor has realized this particular problem and has presented the above solutions to that problem. Generally in the prior art, therefore, strong sensors would detect a large number of hits while weak sensors would detect only a small number of hits. To adjust the system so that all sensors read hits requires that the threshold be set so that the weaker sensor is operating satisfactorily. If a blockage occurs at one of the strong sensors and seeds are still flowing by (but at a reduced speed) the sensor will still be able to detect these seeds and will report a fault free line. An alarm will not be generated until the seed tube actually fills up with seeds and covers the sensor.

In the present invention the calibration has the advantage of being automatic and does not require the operator to adjust its sensitivity. Thus the system is easy to use and results are more repeatable.

Moreover the present system is more responsive to flow of reduction then previous systems because each sensor has a gain that is chosen specifically for the present seeding conditions of that particular sensor. If a blockage occurs that reduces the air flow speed, which will allow seed to strike the sensor, the hits will have less amplitude. This reductions in amplitude will be immediately detectable by the input circuitry. The only limits on response time is the amount of time required to check each sensor(one at a time) and the amount of time to get this information to the main monitor.

If a module reports a blockage, an audible alarm is generated in the tractor. Also a position of the blockage will be indicated on a liquid crystal display showing the module and run numbers. The monitor will continue to poll the module displaying errors as they occur. If a blockage was only transient in nature the alarm will no longer be displayed after it has been cleared. If the blockage does not go away on its own andit not convenient to clear the block immediately, an acknowledge button is provided to silence the audio alarm. The position of the blockage will still be shown periodically on the display. When the implement is stopped, the monitor will continue to display the position of the blockage.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A monitor system for the flow of discrete particulate elements in a duct system comprising a plurality of sensors, each sensor including sensor means for generating a sensor signal when the sensor is impinged upon by one of the elements, and means for mounting the sensor means on a respective one of a plurality of ducts of the duct system, a detection module and means for connecting each of the sensors to the detection module, the detection module including electronic circuit means defining clock means for generating a plurality of sequential time periods each having a length equal to a predetermined length, comparator means for receiving the sensor signals from one of the sensors and arranged to select during one of said sequential time periods those of the sensor signals which have an amplitude greater than a certain value, means for counting the total number of the sensor signals selected, means defining a calibration mode of the detection module, means for generating in the calibration mode a plurality of separate reference values each associated with a respective one of the sensors and dependent upon the number of selected sensor signals counted from the respective sensor in said period of time, means for storing said separate reference values, means defining a detection mode of the detection module, and means responsive during said detection mode to said reference value for each respective sensor and to the number of selected sensor signals from the respective sensor counted during each of said sequential time periods for generating a fault signal associated with said respective sensor.

2. The invention according to claim 1 wherein said means for generating said plurality of reference values is arranged during said calibration mode for each sensor to repeatedly vary for each of a plurality of said sequential time periods said certain value so as to alter said number of selected sensor signals counted in each of said plurality of sequential time periods, said reference value being dependent upon the variation of said certain value.

3. The invention according to claim 2 wherein the certain value is varied in a manner to alter the number of selected sensor signals counted toward a predetermined preferred number and wherein the reference value is dependent upon that value of said certain value in which the number counted most closely approximates to said preferred number.

4. The invention according to claim 2 wherein said means for generating said plurality of reference values generates for each sensor a first reference value dependent upon the variation of said certain value and a second reference value dependent upon an average number of selected sensor signals counted during a plurality of sequential time periods using as said certain value a value dependent upon said first reference value.

5. A monitor system for the flow of discrete particulate elements in a duct system comprising a plurality of sensors, each sensor including sensor means for generating a sensor signal when the sensor is impinged upon by one of the elements, and means for mounting the sensor means on a respective one of a plurality of ducts of the duct system, a detection module and means for connecting each of the sensors to the detection module, the detection module including electronic circuit means defining clock means for generating a plurality of sequential time periods each having a length equal to a predetermined length. means for receiving the sensor signals from each of said sensors. variable amplifier/attenuator means for variably modifying the amplitude of the sensor signals received in dependence upon a gain input value, comparator means arranged to select during one of said plurality of sequential time periods those of the sensor signals for which the modified amplitude is greater than a predetermined fixed value. means for counting the total number of the sensor signals selected, means for defining a calibration mode of the detection module. means for generating in the calibration mode for each sensor. a first reference value. said first reference value comprising that gain input value for the amplifier/attenuator which will generate the number of sensor signals selected to be most closely equated to a preferred number. means for storing said first reference values for the sensors, means for defining a detection mode of the detection module, means in said detection mode for counting the number of sensor signals selected for each sensor using for that sensor the first reference value as the gain input value for the amplifier/attenuator and means for generating a fault signal if the number counted falls below a predetermined number.

6. The invention according to claim 7 wherein the amplifier/attenuator comprises a digital to analog converter such that the gain input values therefor comprise digital signals.

7. The invention according to claim 7 wherein the preferred number is in the range 10 to 40.

8. The invention according to claim 7 wherein the reference value generating means is arranged to generate a second reference value which is dependent upon an average number of selected sensor signals counted during a plurality of said sequential time periods using said reference value as said gain input value for said amplifier/attenuator.

9. The invention according to claim 8 wherein said reference value generating means is arranged to reject said first reference value if the second reference value has a difference form the preferred number greater than a predetermined difference.

10. The invention according to claim 8 wherein the predetermined number is dependent upon the second reference value.

11. The invention according to claim 9 wherein the predetermined number for each sensor is equal to the second reference value divided by a fixed reference value.

12. The invention according to claim 7 including a central control unit and a plurality of said detection modules. each detection module having associated therewith a plurality of said sensors.

13. The invention according to claim 14 wherein the central control unit includes means for inputting into said central control unit a number dependent upon the number of detection modules attached thereto and wherein each of the detection modules includes means for inputting into the detection module a number equal to the number of sensors attached thereto.

14. The invention according to claim 14 wherein said central control unit includes means for transmitting to said detection modules a signal initiating the calibration mode of the detection modules and wherein the central control unit includes means for communicating with each detection module and for receiving signals therefrom relating to the status of calibration.

15. The invention according to claim 14 wherein the central control unit includes means for generating a signal initiating the detection mode of the detection modules and means for communicating with each detection module for information concerning any fault signals generated thereby and means for generating an alarm signal on receipt of said fault signal.

16. The invention according to claim 14 wherein the central control unit includes a ground speed sensor and wherein said calibration signal is transmitted only after detection of a ground speed greater than a predetermined ground speed.

* * * * *